Patented Apr. 13, 1954

2,675,385

UNITED STATES PATENT OFFICE 2,675,385

PYRAZINE-2-CARBOXAMIDE-3-CARBOXYLIC ACID

John S. Webb and Herbert G. Arlt, Jr., Warren Township, Somerset County, N. J., assignors to American Cyanamid Company, New York, N. Y., a corporation of Maine No Drawing. Application January 29, 1953, Serial No. 334,097

14 Claims. (Cl. 260—250)

This invention relates to pyrazine-2-carboxamide-3-carboxylic acid and its salts and methods of preparing the same.

Pyrazine-2-carboxamide-3-carboxylic acid is a compound which possesses chemical properties completely at variance with those of its analogs in the benzene and pyridine series, such as phthalamic and pyridine-2-carboxamide-3-carboxylic acid. The former is hydrolyzed in boiling water to mono-ammonium phthalate (Aschan, Ber. 19, page 1402) and the latter to the mono-ammonium salt of pyridine-2,3-dicarboxylic acid, the hydrolysis occurring in the presence of ordinary hot water and not even requiring boiling water (Philips, Ann., 288, page 255). The compounds of the present invention on heating with water even in the presence of a strong alkali under the conditions of our invention (2 N KOH at 100° C.) do not decompose. It is not known why the compounds of the present invention exhibit such a surprising stability when compared with the behavior of the corresponding compounds in the benzene and pyridine series, and the invention is not intended to be limited to any theory of why this extraordinary stability exists.

The principal use at present for pyrazine-2-carboxamide-3-carboxylic acid is as an intermediate for the preparation of the tuberculostatic drug pyrazinamide which is obtained readily by thermal decarboxylation. This process of preparing pyrazinamide from pyrazine-2-carboxamide-3-carboxylic acid is not claimed in the present application, since it forms the subject matter of our copending application, Serial No. 334,098, filed January 29, 1953.

While the compounds of the present invention are new and are claimed as such, and are therefore not limited to any particular method of preparation, in a more specific aspect of the invention a very desirable process of preparing the compounds from pyrazine-2,3-dicarboxamide is included. This process also is surprising because it is effected by heating in an aqueous solution of strong alkali presenting conditions under which analogous compounds of the benzene and pyridine series are hydrolyzed to ammonium salts of a dicarboxylic acid. The extraordinary stability against hydrolysis of the compound of the present invention, however, permits the use of this simple and economical process.

While the process described in the foregoing paragraph is preferred, and presents many economic advantages, it should be understood that the compound of the present invention may also be prepared by other means, for example, by treating the anhydride of pyrazine-2,3-dicarboxylic acid with anhydrous ammonia or by reacting a mono-ester of pyrazine-2,3-dicarboxylic acid with anhydrous or aqueous ammonia. While either of these processes is entirely feasible, they are not as simple and economical as a preferred process starting with pyrazine-2,3-dicarboxamide, the latter therefore constitutes the preferred embodiment of the process.

Pyrazine-2-carboxamide-3-carboxylic acid is a white crystalline material which is slightly soluble in cold water and more so in hot. It is also soluble in many common organic solvents. Since the compound is an acid, it is readily soluble in dilute solution of various alkalies, such as solutions of hydroxides of the alkali and alkaline earth metals, to form the corresponding salts. It also reacts with heavy metal cations such as, for example, copper to form water insoluble salts. These salts of the acid are also included within the scope of the present invention.

The preferred process referred to above can be carried out by heating pyrazine-2,3-dicarboxamide in any strong alkaline aqueous solution, preferably containing approximately molecular equivalents of the strong alkali. Recovery of the pure acid may be obtained by cooling and acidification. The particular alkali used is not material so long as it is sufficiently strong to hydrolyze one of the carboxamide groups. Among typical alkalies are the hydroxides and carbonates of the alkali metals, such as sodium and potassium, hydroxides of the alkaline earth metals, such as calcium, barium hydroxides and the like. In each case, the corresponding salt is formed and the free acid can be recovered from solution by acidification.

It is an advantage of the preferred process of the present invention that the reaction temperature is not in any way critical, hydrolysis occurring over a range of temperatures from 30 to 105° C. or even higher. In general, however, the very low temperatures are undesirable because the reaction time is excessively long. Optimum results are obtained at and near the boiling point of water, for example, from a temperature range of 95 to 100° C.

The amount of alkali used must be at least molecularly equivalent to the pyrazine-2,3-dicarboxamide, that is to say, sufficient to hydrolyze one of the carboxamide groups. An excess of alkali may be used, particularly where the reaction mixture is relatively dilute and where somewhat lower temperatures may be employed. However, a large excess of alkali should ordinarily be avoided as in the presence of a large excess there is some tendency toward hydrolysis of the second carboxamide group to produce the dicarboxylic acid. It is therefore preferable to operate with substantially stoichiometrical quantities of alkali or a slight excess.

The acid used in acidification in order to precipitate the free acid is likewise not critical and any acid may be used which is stronger than pyrazine-2-carboxamide-3-carboxylic acid itself. Typical of these acids are strong mineral acids, such as sulfuric, hydrochloric, nitric, etc., but strong organic acids, such as maleic acid can be used if desired.

The invention will be described in greater detail in conjunction with the following specific examples, the parts being by weight unless otherwise specified.

Example 1

166 parts (1 mol) of pyrazine-2,3-dicarboxamide are slurried in 1000 parts of 1 N aqueous sodium hydroxide solution. The mixture is heated to 95 to 98° C. until solution is complete. Thereupon the reaction mixture is cooled with ice and acidified to a pH of approximately 1. The mixture is allowed to stand at 5° C. until precipitation is substantially complete. It is then recovered by filtration and dried at 50 to 60° C.

Example 2

166 parts of pyrazine-2,3-dicarboxamide are slurried in 800 parts of water containing 106 parts of sodium carbonate. The reaction mixture is then heated at 80 to 90° C. until a clear solution is obtained. Thereupon the reaction mixture is cooled to room temperature and is acidified to a pH of approximately 1. Precipitation is started and is completed by further cooling to about 5° C. at which temperature the mixture is maintained until precipitation is complete. Thereupon the pyrazine-2-carboxamide-3-carboxylic acid is recovered by filtration and dried in air.

Example 3

166 parts of pyrazine-2,3-dicarboxamide is added to 500 parts of 2 N aqueous potassium hydroxide. The reaction mixture is allowed to stand at room temperature with gentle agitation until the solution is substantially clear. Thereupon the reaction mixture is acidified to approximately pH 1, cooled to 5° C. and allowed to stand until precipitation of the pyrazine-2-carboxamide-3-carboxylic acid is substantially complete. The product is then recovered by filtration and air dried.

Example 4

166 parts of pyrazine-2,3-dicarboxamide and 28 parts of calcium oxide are slurried in 800 parts of water and heated to 90 to 100° C. until reaction is complete. Insoluble material present is removed by hot filtration. The filtrate is then cooled and treated in the same manner as the cooled reaction mixture of Example 1.

We claim:

1. A product having the following formula

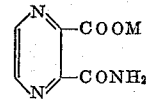

in which M is a cation.

2. Pyrazine-2-carboxamide-3-carboxylic acid.

3. A process which comprises reacting pyrazine-2,3-dicarboxamide with strong aqueous alkali until a solution of a salt of pyridine-2-carboxamide-3-carboxylic acid is formed.

4. A process according to claim 3 in which the alkali is sodium hydroxide.

5. A process according to claim 3 in which the alkali is potassium hydroxide.

6. A process according to claim 3 in which the alkali is sodium carbonate.

7. A process which comprises heating pyrazine-2,3-dicarboxamide with strong aqueous alkali, the amount of alkali being at least stoichiometrical but in the absence of a large excess until a solution of salt of pyrazine-2-carboxamide-3-carboxylic acid is formed.

8. A process according to claim 7 in which the alkali is sodium hydroxide.

9. A process according to claim 7 in which the alkali is sodium carbonate.

10. A process according to claim 7 in which the alkali is potassium hydroxide.

11. A process of preparing pyrazine-2-carboxamide 3-carboxylic acid which comprises reacting pyrazine-2,3-dicarboxamide with strong aqueous alkali until a solution of a salt of pyrazine-2-carboxamide 3-carboxylic acid is produced, acidifying to transform the salt into the free acid and recovering the free acid from the reaction mixture by filtration.

12. A process according to claim 11 in which the alkali is sodium hydroxide.

13. A process according to claim 11 in which the alkali is sodium carbonate.

14. A process according to claim 11 in which the alkali is potassium hydroxide.

No references cited.